C. C. FARMER.
FLUID PRESSURE BRAKE.
APPLICATION FILED AUG. 7, 1920.
1,400,597. Patented Dec. 20, 1921.
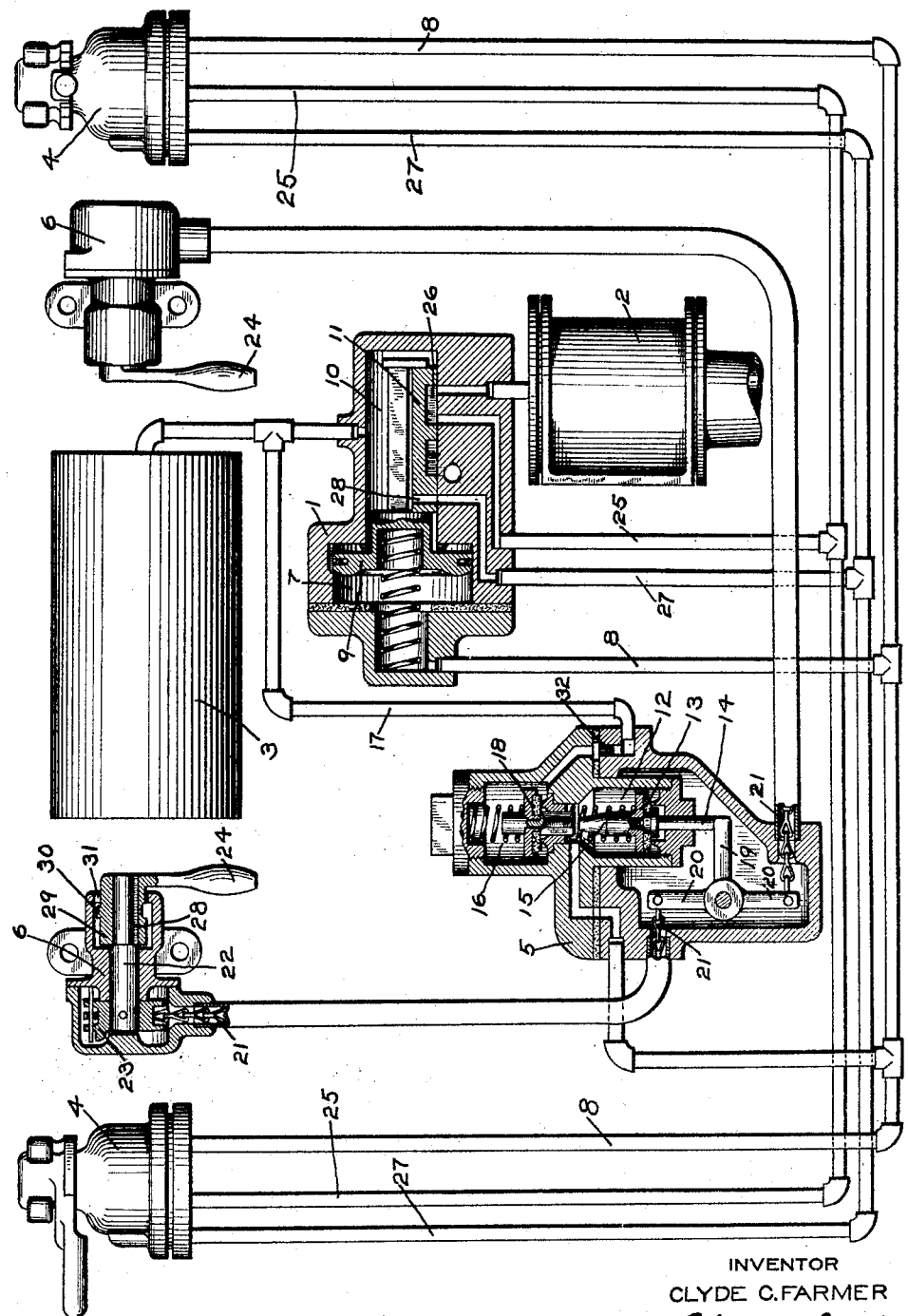
INVENTOR
CLYDE C. FARMER
BY Wm. N. Cady
ATTORNEY

UNITED STATES PATENT OFFICE.

CLYDE C. FARMER, OF EDGEWOOD, PENNSYLVANIA, ASSIGNOR TO THE WESTINGHOUSE AIR BRAKE COMPANY, OF WILMERDING, PENNSYLVANIA, A CORPORATION OF PENNSYLVANIA.

FLUID-PRESSURE BRAKE.

1,400,597.  Specification of Letters Patent.  Patented Dec. 20, 1921.

Application filed August 7, 1920. Serial No. 401,897.

*To all whom it may concern:*

Be it known that I, CLYDE C. FARMER, a citizen of the United States, residing at Edgewood, in the county of Allegheny and State of Pennsylvania, have invented new and useful Improvements in Fluid-Pressure Brakes, of which the following is a specification.

This invention relates to fluid pressure brakes, and more particularly to a straight air emergency brake equipment.

With an equipment of the above character, it has heretofore been proposed to provide an emergency valve device adapted upon movement to emergency position, to cut off communication from the main reservoir to the main reservoir pipe leading to the brake valve device, so that, among other reasons, if the main reservoir pipe should break or leak, loss of main reservoir pressure and brake cylinder pressure, by flow to the main reservoir pipe, when the brakes are applied, will be prevented.

As the main reservoir pipe is thus cut off from the brake valve device in the emergency position of the emergency valve device, it will be seen that the brakes cannot then be released by the usual manipulation of the brake valve.

One object of my invention is to provide improved means for effecting the release of the brakes in an equipment of the above character.

Another feature of my invention contemplates locating a single release valve mechanism near the main reservoir and the operation of same by mechanical manually operated means, so that the length of the connecting pipe is reduced and also the liability of the pipe to breakage.

In the accompanying drawing, the single figure is a diagrammatic view, partly in section, of a fluid pressure brake equipment with my invention applied thereto.

As shown in the drawing, the equipment may comprise an emergency valve device 1, a brake cylinder 2, a main reservoir 3, a brake valve device 4 at each end of the car, a release valve mechanism 5, and a manually operated device 6 at each end of the car for controlling the operation of the release valve mechanism.

The emergency valve device 1 comprises a casing having a piston chamber 7, connected to brake pipe 8, and containing piston 9, and a valve chamber 10, connected to the main reservoir 3, and containing a slide valve 11, adapted to be operated by piston 9.

The release valve mechanism 5 may comprise a casing having a valve chamber 12, connected to the brake pipe 8, and containing a puppet valve 13 carrying a downwardly extending stem 14 and an upwardly extending stem 15, the valve 13 being for the purpose of preventing leakage from chamber 12 past the stem when the valve is seated.

The casing also has a valve chamber 16, connected by pipe 17 to the main reservoir 3, and containing a puppet valve 18 adapted to be operated by the stem 15 for supplying fluid under pressure from the main reservoir to valve chamber 12 and the brake pipe 8.

An operating member is pivotally mounted within the casing and has an arm 19 adapted to engage the stem 14 and arms 20 each connected to a chain 21 leading to the manual operating device 6 at each end of the car.

Each operating device 6 may comprise a casing within which is mounted a shaft 22, carrying at one end a drum 23 to which the chain 21 is attached, and provided at the other end with an operating handle 24.

The usual straight air pipe 25 is connected to each brake valve device 4 and leads to the seat of slide valve 11 and in the normal release position of the slide valve is connected through cavity 26 with the brake cylinder 2.

A main reservoir supply pipe 27 is connected to each brake valve device and leads to the seat of the emergency slide valve 11.

In operation, when the emergency slide valve 11 is in normal release position, as shown in the drawing, fluid under pressure is supplied from valve chamber 10 and the main reservoir 3, through port 28 in the slide valve, to the main reservoir supply pipe 27, so that the brake valve device 4 is supplied with fluid from the main reservoir for permitting the usual manipulation of the brake valve in controlling the application and release of the brakes.

Upon a reduction in brake pipe pressure the emergency piston 7 shifts the slide valve 11 to emergency position, in which fluid is supplied from valve chamber 10 and the main reservoir 3, directly to the brake cylinder 2 in the usual manner.

In this position, the main reservoir supply pipe 27 is cut off from the main reservoir, so that the brakes cannot then be released by manipulation of the brake valve.

If the operator desires to release the brakes, he turns one of the handles 24, so as to wind up the chain 21 and thereby operate the corresponding arm 20, so that the arm 19 is operated to lift the stem 14.

The stem 15 then unseats the valve 18, so that fluid under pressure is supplied from the main reservoir 3, through pipe 17 to the brake pipe 8, thereby increasing the pressure in the brake pipe, so that the emergency piston 7 will be shifted to release position.

In order to lock the release valve mechanism in its open position, the handle 24 may be slidably mounted on the shaft 22 to which the handle is rotatably connected by a spline 28 and the hub 29 of the handle may be provided with a tooth 30 adapted upon lateral sliding movement of the handle to engage a corresponding notch 31 in the member 6 and adapted to aline with the tooth 30 when the handle is turned to its release valve operating position.

In order to prevent rapid loss of main reservoir pressure in case the emergency brake pipe 8 should brake and for some reason the valve 18 should fail to seat, a choke plug 32 having a restricted port, may be interposed in the passage connecting the pipe 17 with the valve chamber 16.

Having now described my invention, what I claim as new and desire to secure by Letters Patent, is:—

1. In a fluid pressure brake, the combination with a brake pipe and an emergency valve device operated upon a reduction in brake pipe pressure for effecting an application of the brakes, of a source of fluid under pressure, a release valve mechanism for supplying fluid from said source to the brake pipe to effect the release of the brakes, and means at each end of the car for operating said release valve mechanism.

2. In a fluid pressure brake, the combination with a brake pipe and an emergency valve device operated upon a reduction in brake pipe pressure for effecting an application of the brakes, of a source of fluid under pressure, a release valve mechanism for supplying fluid from said source to the brake pipe to effect the release of the brakes, and mechanical manually operated means at each end of the car for operating said release valve mechanism.

3. In a fluid pressure brake, the combination with a brake pipe and an emergency valve device operated upon a reduction in brake pipe pressure for effecting an application of the brakes, of a source of fluid under pressure, a release valve mechanism located near said source and operative to supply fluid from said source to the brake pipe to effect the release of the brakes, and means at each end of the car for operating said release valve mechanism.

4. In a fluid pressure brake, the combination with a brake pipe and an emergency valve device operated upon a reduction in brake pipe pressure for effecting an application of the brakes, of a main reservoir, a release valve mechanism located near the main reservoir and operative to supply fluid from the main reservoir to the brake pipe to effect the release of the brakes, and means at each end of the car for operating said release valve mechanism.

5. In a fluid pressure brake, the combination with a brake valve device, a brake pipe, and an emergency valve device operated upon a reduction in brake pipe pressure for effecting an application of the brakes, of a main reservoir, a release valve mechanism located adjacent to the emergency valve device and operative to supply fluid from the main reservoir to the brake pipe to effect the release of the brakes and a handle located adjacent to the brake valve device and operatively connected to the release valve mechanism.

6. In a fluid pressure brake, the combination with a brake pipe, an emergency valve device operated upon a reduction in brake pipe pressure for effecting an application of the brakes, and a brake valve device for controlling the brakes, of a main reservoir, a main reservoir supply pipe connected to said brake valve device and adapted to be charged from the main reservoir through a port controlled by said emergency valve device and a release valve mechanism operative to supply fluid under pressure from the main reservoir to the brake pipe to effect the release of the brakes.

7. In a fluid pressure brake, the combination with a brake pipe, an emergency valve device operated upon a reduction in brake pipe pressure for effecting an application of the brakes, and a brake valve device for controlling the brakes, of a main reservoir, a main reservoir supply pipe connected to said brake valve device, the emergency valve device being operative in release position to supply fluid from the main reservoir to said supply pipe and in emergency position to cut off the supply and a release valve mechanism for supplying fluid from the main reservoir to the brake pipe to effect the release of the brakes when the emergency valve device is in emergency position.

In testimony whereof I have hereunto set my hand.

CLYDE C. FARMER.